United States Patent [19]

Evans

[11] Patent Number: 4,550,601
[45] Date of Patent: Nov. 5, 1985

[54] METHOD FOR DETERMINING THE MAGNITUDE OF EARTH'S GRAVITY

[75] Inventor: Alan G. Evans, LaPlata, Md.

[73] Assignee: The United States of America as represented by the Secretary of the Navy, Washington, D.C.

[21] Appl. No.: 583,562

[22] Filed: Feb. 27, 1984

[51] Int. Cl.$^4$ .............................................. G01V 7/16
[52] U.S. Cl. ................................................ 73/382 R
[58] Field of Search ......................... 73/382 R, 382 G

[56] References Cited

U.S. PATENT DOCUMENTS

| | | | |
|---|---|---|---|
| 3,803,916 | 4/1974 | DeMatteo et al. | 73/382 |
| 3,888,122 | 6/1975 | Black | 73/382 |
| 4,170,776 | 10/1979 | MacDoran | 343/458 |
| 4,295,372 | 10/1981 | DeMatteo et al. | 73/178 R |
| 4,435,981 | 3/1984 | Carson et al. | 73/382 R |

*Primary Examiner*—Stewart J. Levy
*Assistant Examiner*—John E. Chapman, Jr.
*Attorney, Agent, or Firm*—R. F. Beers; A. L. Branning; E. E. Goshorn

[57] ABSTRACT

An improved method that directly and continuously determines the magnitude of the earth's gravity in relation to a user platform at one or more selected points on or above the earth's surface. An improved Global Positioning System (GPS) is used to carry out the method and is made up of a plurality of twenty-four (24) continuously orbiting GPS satellites that are arranged into three groups of eight satellites with each group or constellation being disposed in its respective plane of a series of three longitudinal planes. Each plane is arranged in predetermined angular and spatial relation to the earth's equatorial plane and the other planes of the series. Any GPS satellite continuously transmits a pair of encoded RF signals at predetermined L-band frequencies. By virtue of this global arrangement of the 24 satellites, the antenna field of view of a user platform is capable of receiving at any time the encoded signals of at least six satellites. A geodetic receiver on the platform together with a receiver microprocessor, a navigation microprocessor, and a microcomputer progressively and continuously process signals received from the satellites for the ultimate purpose of comparing GPS dtermined vertical acceleration (that is normal to the earth's modeled ellipsoid) with its platform-measured gravimeter acceleration (that is normal to the earth's geoid) so as to determine, with greater accuracy, the gravity at one or more selected points. By reason of the improved GPS systems carrying out the method of continuously and directly determining gravity with greater accuracy at one or more points, a given area can be readily surveyed in relation to the user platform as well as enabling corrections to inertial navigation equipment and enhancing the guidance of weaponry (missiles, etc.) during firing or launch.

15 Claims, 6 Drawing Figures

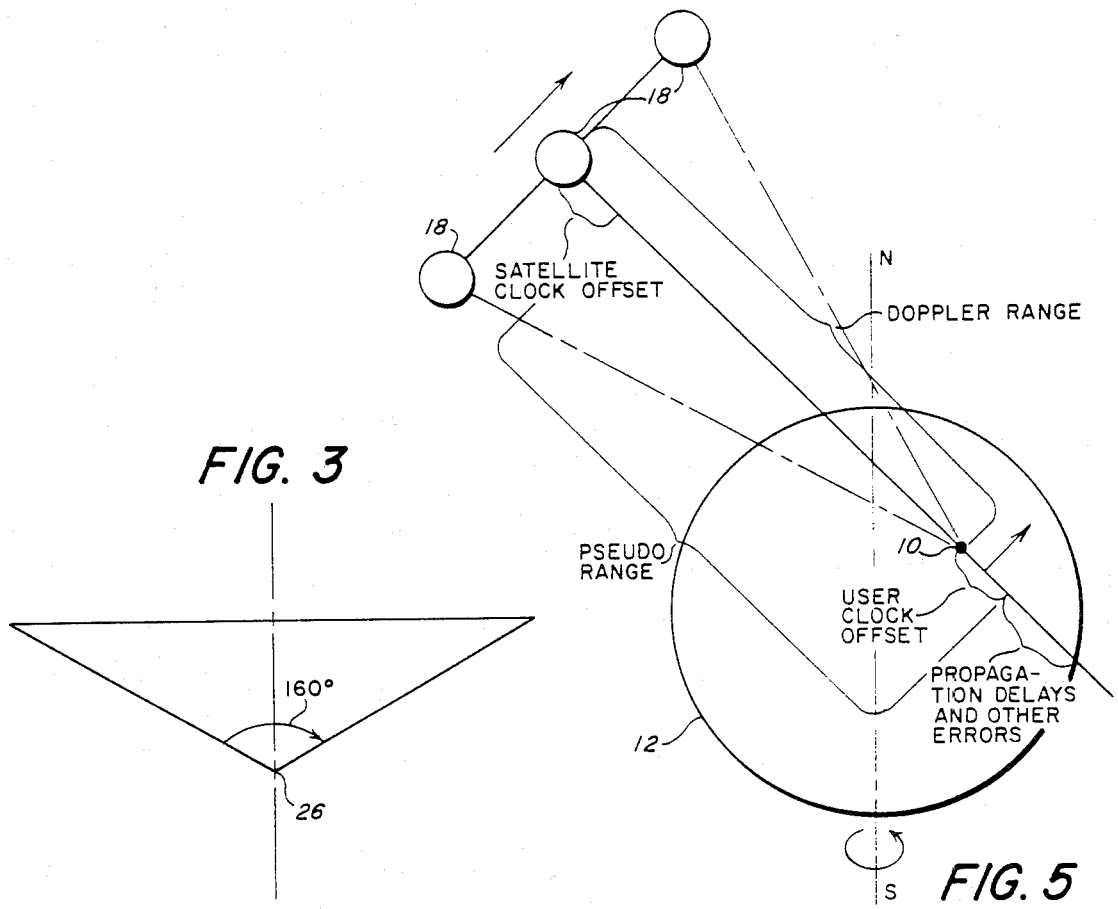
FIG. 3
FIG. 5
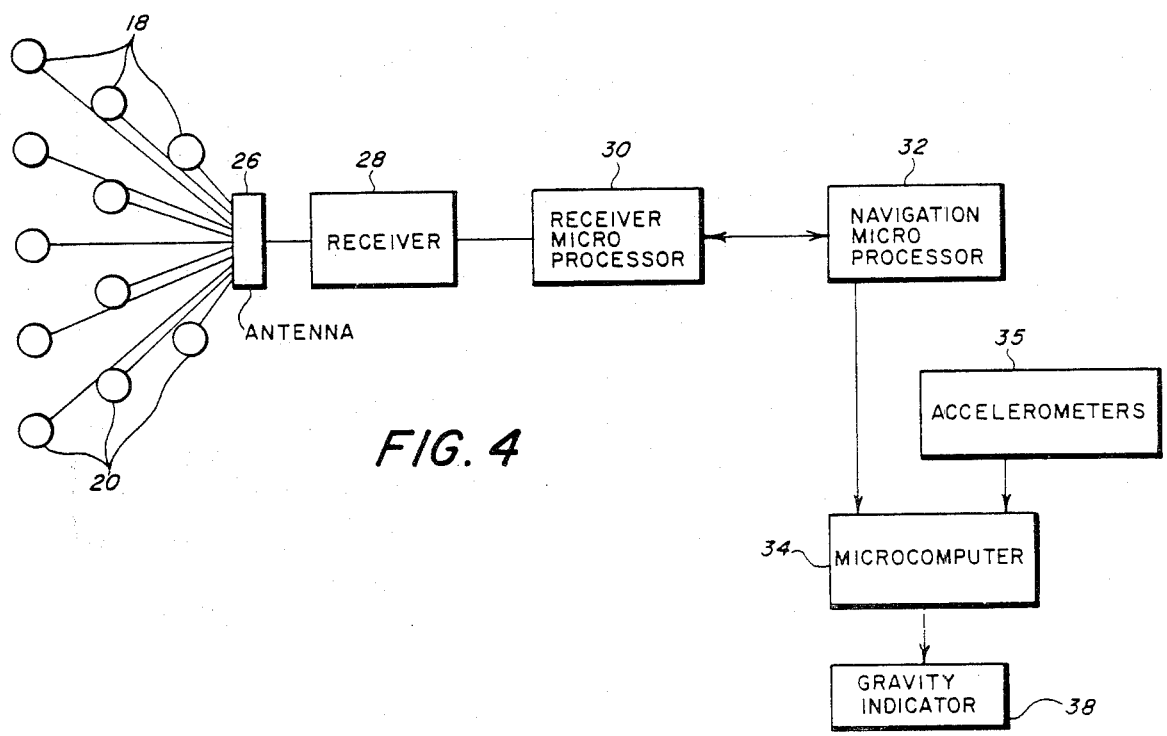
FIG. 4

METHOD FOR DETERMINING THE MAGNITUDE OF EARTH'S GRAVITY

BACKGROUND OF THE INVENTION

The present invention relates to a method of directly and continuously determining the magnitude of the earth's gravity at one or more selected points and, more particularly, it relates to a method for directly and continuously determining the earth's gravity at one or more selected points by way of a computerized arrangement for deriving the difference between the vertical accelerations of a Global Positioning System (GPS) user platform and the gravimeter acceleration of the same platform.

Various techniques have been developed by the prior art for determining the effects of the earth gravitational field along or above the earth's surface. These techniques have been important for navigational purposes; seismic studies, geological studies, etc. Such techniques have included rotating masses, which are counterbalanced, that respond to changes in a gravitational field so as to indicate the gravitational gradient at a preselected point Other techniques have included satellites arrangements for determining changes in the gravitational field at a particular point by radar altimetry and the Doppler effect. These prior techniques were often time-consuming and often did not exhibit the best accuracy for navigation purposes, etc. For example, U.S. Pat. No. 3,803,916 to DeMatteo et al. concerns the combined arrangement of a ship inertial navigation system (SINS) and a long range navigation signal from a ground station (LORAN) for determining the vertical deflection gravity at a selected point on the ocean surface. U.S. Pat. No. 4,295,372 to DeMatteo merely concerns an improved SINS. To this end the SINS is generally made up of a velocity meter and a computer with an inverse filter for indicating the gravity at a selected point on the ocean surface. Another U.S. Pat. No. 3,888,122 to Black discloses a double satellite system, with each satellite moving in the same orbital path about the earth, for measuring the earth gravitational field at a selected point on the earth surface. By reason of the double satellites having Doppler radar altimeters, the satellites are able to measure and indicate two independent components of the gravity at a selected point on the ocean surface. However, none of the aforediscussed patents, taken singly or in any combination, remotely suggest the use of a multiple earth-orbit, multiple satellite, and computerized Global Positioning System (GPS) for directly and continuously determining, not only in less time but with greater accuracy than heretofore obtainable, the gravity at one or more selected points on or above the earth (ground or ocean) surface. One advantage of the improved method of the computerized GPS system of the present invention is that more accurate determining of the gravity at one or more selected points enables the inertial navigation system of a vessel or aircraft to be corrected with greater accuracy. Further, obtaining the gravity data with greater accuracy at more than one selected point by virtue of the improved method of the invention is of assistance in numerically determining the angle of deflection between GPS determined vertical acceleration of a user platform and the gravimeter acceleration thereof. Such assistance is significant in accurately predicting the trajectory of a weapon or missile prior to firing or launch.

SUMMARY OF THE INVENTION

An object of this invention is to make a direct determination of the magnitude of the earth's gravity at one or more selected points in relation to the earth's surface, such that the determination is made with greater accuracy, especially above a land surface.

Another object of this invention is to provide the magnitude of the earth's gravity at one or more selected points in a given area so as to provide an accurate survey thereof.

A further object of this invention is to provide a method which will continuously determine the magnitude of the earth's gravity for any number of selected points along a user path.

Still another object of the invention is to provide a method to determine the magnitude of the earth's gravity at one or more selected points whether a point is either on or spaced above the earth's (ground or water) surface.

Yet a further object of this invention is to provide a plurality of multi-earth-orbiting and relatively spaced GPS satellites for continuously transmitting digitally encoded RF signals at predetermined frequencies to be received by a receiver on a GPS user platform so that the signals can be processed by the receiver for directly and continuously determining earth's gravity data of the user platform.

A summary of the invention is an improved method for directly and continuously determining the earth's gravity at one or more selected points in relation to the earth's surface. In carrying out this method, each one of a plurality of twenty-four (24) earth-orbiting and relatively spaced GPS satellites continuously transmit digitally encoded RF signals at predetermined frequencies towards the earth's surface. The plurality of 24 satellites are arranged into three groups of eight (8) satellites, with the 8 satellites of each group being disposed in their common orbital path in a longitudinal plane of a series of three relatively spaced longitudinal planes in relation to the earth. These longitudinal planes are disposed in predetermined angular relation to each other and the earth's equatorial plane. By reason of the plurality of 24 GPS satellites being equally divided into groups of eight in each of the series of three longitudinal planes, a series of GPS satellites of the 24 satellites are always in the horizon of a user platform and normally within the field of view of the antenna on the user platform. Signals of the series of GPS satellites are processed by the receiver of the platform along with a receiver microprocessor and a navigation microprocessor. This processing compares the different signals of each satellite of the series and then selects and tracks the signals of an optimum group of four satellites of the series for initially determining both the pseudo range (determined from the difference between a selected satellite transmitter and receiver times) and the Doppler pseudo range (determined from the biased phase measurements of the received signals) between the user platform and each GPS satellite of the selected optimum group of four satellites. By virtue of the plurality of relatively spaced 24 GPS satellites, at least six GPS satellites of the 24 are always in the horizon in relation to a user platform and depending upon the field of view of the antenna at least the signals of four GPS satellites are always received by the platform receiver. In order to minimize the error in determining the Doppler range between a tracked satellite and the user platform, the navigation microprocessor is selectively programmable by the user so as to compensate for changes in weather conditions, etc., that cause propagation delays or errors in signals being transmitted from each satellite. A microcomputer is programmed to derive the relative radial acceleration from the Doppler phase measurements between each optimum tracked satellite and the platform from the previously determined relative radial veocity therebetween and to resolve the relative radial acceleration between each optimum satellite and the platform to the GPS total vertical acceleration of the platform. A gravimeter of appropriate design as mounted on the platform provides a continuous signal input to the microcomputer that indicates the gravimeter acceleration of the platform. The microcomputer is also programmed to compare and take the difference between the GPS determined vertical acceleration of the platform and the gravimeter acceleration thereof thereby yielding the gravity magnitude.

Other objects, advantages and novel features of this invention will become apparent from the following detailed description of the invention when considered in conjunction with the accompanying drawings wherein:

BRIEF DESCRIPTION OF THE DRAWINGS

FIG. 3 is an enlarged cross-sectional diagrammatic view of a component of the GPS system as used with the invention.

FIG. 4 is a schematic of the computerized arrangement of a GPS user platform for receiving and processing signals from GPS satellites;

FIG. 5 is another enlarged diagrammatic view as taken within section line 5—5 of FIG. 2 and with parts added to illustrate more than one advancing orbital position of one GPS satellite in relation to a GPS user platform on or above the earth surface.

DETAILED DESCRIPTION OF THE INVENTION

Figure 1:
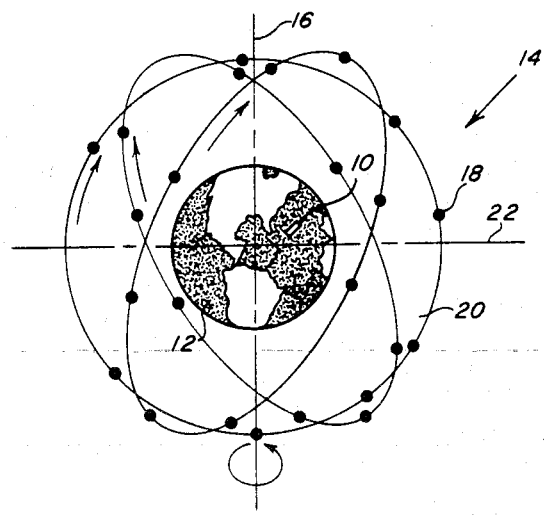
FIG. 1 is a diagrammatic view of the global positioning system (GPS) that embodies the present invention.

With further reference to FIG. 1, an improved method for directly determining the earth's gravity magnitude of a user platform 10 at one or more selected points in relation to the earth's surface 12 is effected by a global positioning system (GPS) 14 that is disposed above the platform and the earth's surface. The earth rotates about its north-south axis 16 in the manner shown. The GPS is generally made up of a plurality of twenty four (24) multiorbit and relatively spaced satellites or space vehicles 18 with the plurality of 24 satellites being arranged in three groups of eight. Each group or constellation of eight satellites is disposed in its respective plane 20 of a series of three longitudinal planes in relation to the earth. A satellite of a given group is arranged in a nearly circular orbital path in its respective plane about the earth and in equal spaced relation to each other. A satellite in its orbital path of a plane has an altitude of about 20,000 kilometers above the earth. Each plane 20 is disposed in angular and spatial relation to each of the other two planes so as to form an angle of approximately 120 degrees between adjacent and intersecting planes. At the same time, each plane 20 is disposed in angular relation to the equatorial plane 22 so as to form an angle of about 63° therebetween. The time of a satellite to travel in its planar orbit about the earth is approximately twelve hours.

Each satellite is battery powered with solar rechargeable batteries so as to continuously transmit a pair of encoded pseudo navigation bearing signals at predetermined L-band frequencies of $L_1$ of 1227.6 megaHertz (MH) and $L_2$ of 1575.42 MH. One reason for these pair of signals from each satellite is to compensate for the adverse effects of the ionosphere which would otherwise result in inaccurate determination of the Doppler range between a satellite 18 and platform 10 if only one signal were transmitted by the satellite. These signal frequencies of each satellite are a multiple of a 10.23 MH atomic clock that is mounted in each satellite. The clock has a stability up to $10^{-13}$. The pair of transmitted signals of each satellite are distinctively encoded so that a platform 10 can identify the signals of each satellite within the field of view of an antenna 26 on the platform at any time. For instance, the memory capacity of each satellite is such that each encoded signal of a satellite is preferably designed to recycle every seven-day period. Before a satellite transmits its pair of signals, each signal of the pair is modulated into an encoded 50 bit/second (bps) digital data stream for transmission to the earth.

Depending on the design of each antenna for the platform, the field of view of each antenna will extend up to about a solid conical angle of approximately 160° of the horizon; and it extends generally in an upward and outwardly divergent direction of the antenna such that the antenna vertical axis is aligned with and substantially coincidental with the vertical axis of the platform as shown in FIG. 3. When an antenna has a field of view of about 160°, and depending upon the position of platform 10 in relation to the earth's surface, it can view up to about eleven GPS satellites in the horizon at any time in the manner shown in FIG. 2.

A single channel geodetic receiver 28 is mounted on platform 24 in an appropriate manner and is operatively connected to antenna 26 as shown in FIG. 4. The receiver is generally comprised of a clock (oscillator) (not shown) that generates a 10.23 MHz signal which is a multiple of the frequency of the encoded signals from each satellite. The receiver's single channel is multiplexed to resolve the parallel data streams of the other received satellite signals into a serial data stream. The receiver is also provided with a receiver microprocessor 30 that has stored therein all of the coded signals of each GPS satellite 18.

As evident from FIG. 5, as each satellite moves along its orbital path in a given longitudinal plane relative to both the earth and the antenna field of view of user platform 10, the radius or range between the satellite and platform 10 progressively changes. In other words, as the satellite approaches the platform on the horizon, the range between the platform and the satellite progressively decreases until the satellite is directly overhead. Then, as the satellite passes from overhead to beyond the horizon the range between the satellite and the platform progressively increases. By virtue of the Doppler effect and the pair of signals being transmitted from each satellite, the phase shift of the received signals from each satellite within the antenna field of view can be correlated and matched with the satellite signals stored within receiver microprocessor 30 so as to determine the time difference between the matched signals and also initially determine the biased Doppler pseudo range between the satellite and the user platform.

The output of microprocessor 30 is connected to the input of navigation microprocessor 32 as illustrated in FIG. 4. The navigation microprocessor includes a selectively changeable data base. The data base is changeable to compensate for, among other things, change in the ephemeris of a satellite 18, clock error of either the receiver or one or more satellites, relativistic effects between platform 10 and any satellite, selective almanac information and local weather conditions. One advantage of microprocessor 32 in having a selectively changeable data base is that the microprocessor not only compensates for satellite signal, propagation delays, but also satellite and receiver clock errors. Because of the data base of the navigation microprocessor and the feedback from microprocessor 32 to the receiver microprocessor, the signals of an optimum group of four satellites of the series of satellites, that were initially matched by receiver microprocessor, are now selected and tracked. Since the data base of microprocessor 32 assists in minimizing the errors of signal delay, clock error, etc, the Doppler range between the platform and each optimum satellite is determined with greater accuracy than would be the case by receiver microprocessor 30 itself. It is noted here that in view of the relativistic effects and other non-compensable effects between a satellite 18 and platform 10, it is impossible for GPS 14 to provide the absolute range therebetween. Hence, microprocessors 30 and 32 of the GPS system in selecting an optimum group of four satellites for tracking in relation to platform 10 assures that the gravity magnitude will be determined with minimal error.

Since the altitude of each satellite is known, navigation microprocessor 32 also functions to determine by well known triangulation techniques the navigation position of platform 10 at a selected point in relation to or above the earth's surface. Moreover, because each optimum tracked satellite is continuously transmitting encoded signals to microprocessor 30, the microprocessor further functions to determine the rate of change in the frequency of the signals received as the Doppler range progressively changes between the satellite and the platform. Determining this rate of change for each optimum tracked satellite is the relative radial velocity between a satellite and the platform. The relative radial velocity of each optimum tracked satellite of the group of four satellites is transmitted as an output from microprocessor 32 to microcomputer 34.

Although not heretofore mentioned, GPS 14 is also comprised of a combined satellite field monitoring and master control ground system. The GPS ground and monitoring system is provided with a series of at least four survey or monitoring field stations that are disposed at selected ground locations around the earth for continuously monitoring the signals of each satellite. If a field station detects any material change in a satellite signal that is not within an acceptable tolerance, the field station sends a corrective signal to a GPS master control ground station of the combined system. For the sake of brevity the combined system is not shown. The control station upon receiving and collecting reports from all ground stations as to the position and signal accuracy of each satellite will timely transmit a corrective signal to the proper satellite so that the satellite will correct itself and thus transmit signals to platform 10 that are acceptable for accurately determining the navigation position and gravity of the user platform at one or more selected points in accordance with the invention. Corrective signals to a satellite 18 from the control station primarily include, but are not limited to, correction of satellite attitude, change in the satellite orbital path, and selective changes in the encoded signals of a satellite so as to compensate for satellite clock error. By reason of the GPS combined earth monitoring and master control system, satellite orbital positions are continuously monitored for correction and thus satellite signal transmission errors are significantly minimized.

It has been found by virtue of the corrective action of the combined ground monitor and master control system together with the selectively controllable data base of microprocessor 32, the navigation position of platform 10 at one or more selected points is obtainable with an error less than ten (10) meters. It is noted here that so long as the dynamics (motion) of a platform are maintained at a minimum such as the normal cruise speed of a ground vehicle, a marine vessel or an aircraft not in a dogfight or similar type of high performance maneuvers, an error of less than 10 meters is maintainable in using GPS in determining the navigation position of the platform.

Figure 2:
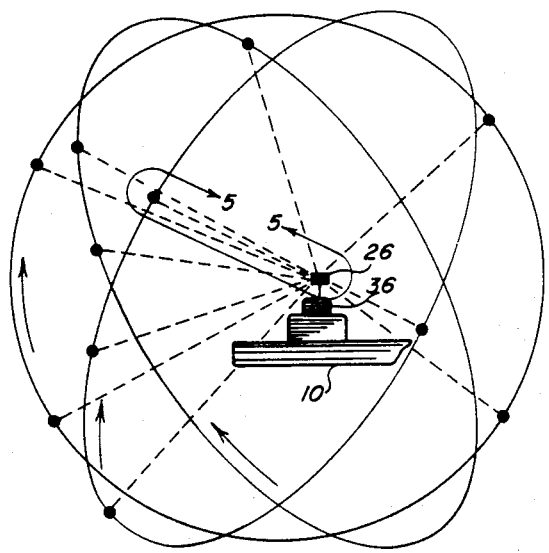
FIG. 2 is an enlarged diagrammatic view of FIG. 1, with parts added and other parts removed to further illustrate details of the invention.

Microcomputer 34 is programmed to derive the relative radial acceleration between each optimum satellite and platform 10 from the relative radial velocity therebetween. This is effected by the microcomputer further processing the signals of the optimum group of satellites with their matched and correlated receiver stored signals so as to determine the change in the rate of change in the frequency of these satellite signals as the optimum tracked satellites continuously move across the horizon. The microcomputer then further functions to transform the relative radial accelerations of all optimum satellites to determine GPS vertical acceleration. Here, the vertical acceleration is normal to the earth's modeled or mathematically determined ellipsoid As schematically indicated in FIG. 2, user platform 10 is provided with a commercially available gravimeter 36 of appropriate design. A gravimeter is generally comprised of a plurality of three linear accelerometers. These accelerometers are disposed in mutually orthogonal relationship to each other. Two of the three accelerometers are mounted in the same plane while a third accelerometer of the three depends from the same plane or is suspended therefrom. The two accelerometers in being in the same plane function to maintain the third accelerometer in alignment with the earth's gravity in relation to the earth's geoid. Since platform 10 is under the influence of gravity, the third accelerometer functions to determine the gravimeter acceleration of the platform due to forces other than gravity in relation to the earth's geoid. The microcomputer also functions to compare GPS vertical and gravimeter accelerations so as to determine the gravity magnitude at one or more selected points of the platform. Even though the GPS vertical acceleration is in relation to the earth's modeled ellipsoid and the gravimeter acceleration is in relation to the earth's geoid, the angle of deviation between the two accelerations is normally very minute and as such is not always taken into account as is the case with the instant invention. Because of the accuracy of the computerized arrangement of a GPS platform 10 together with the monitoring and master control ground system of the GPS in determining the gravity magnitude at one or more selected points of the platform, it has been found as presently understood that the magnitude of the gravity error is less than approximately five (5) milligals when the platform is moving at a speed of no more than 100 meters/second (194 knots).

Figure 6:
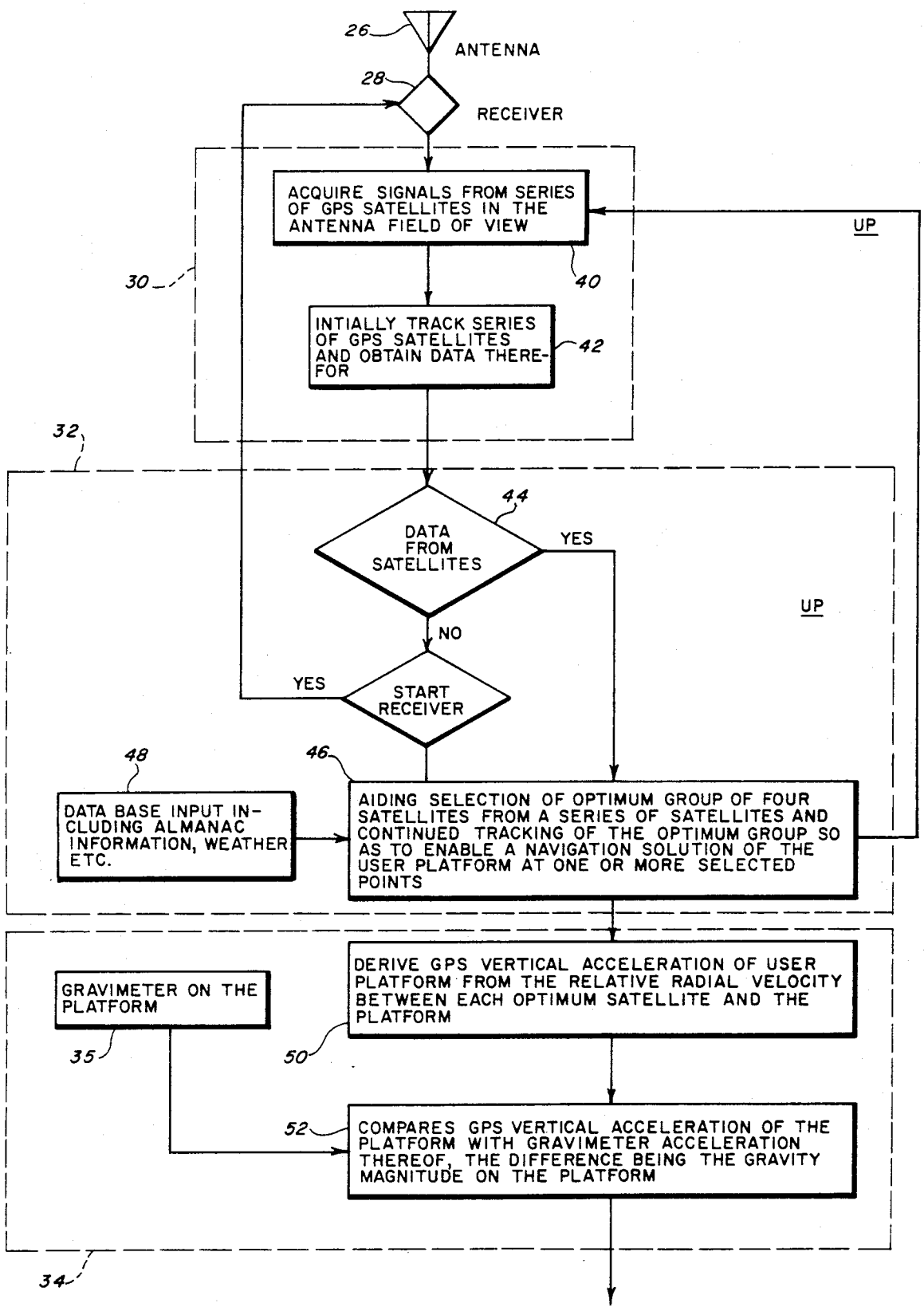
FIG. 6 is a schematic of the flow chart for the arrangement of FIG. 4.

A flow chart of the operative relationship between microprocessors 30 and 32 and microcomputer 34 is illustrated in FIG. 6. When signals from a series of satellites 18 are received by receiver 28 they are first multiplexed into an overall serialized data stream. The encoded and stored data streams of receiver microprocessor 30 are driven by the receiver clock and matched with the initially tracked incoming signals from the series of satellites within the field of view of antenna 26 as indicated by block 42.

When GPS satellite signal data is being received from the output of the receiver microprocessor, block 44 of navigation microprocessor 32 provides a "Yes" output to block 46. Block 48 furnishes up-to-date information to block 46 such as, for example, local weather conditions. Comparison of this data information with the data from block 42 enables block 46 to send an output to block 40 for selecting and tracking an optimum group of four satellites from the series of GPS satellites signals being received by receiver 28. With blocks 40 and 42 now functioning to track the optimum group of four satellites, block 46 further functions to provide a navigation solution for platform 24 including the relative radial velocity between each optimum satellite and the platform.

Block 50 of microcomputer 34 receives the output of block 46 and transforms the relative radial velocity of platform 10 in relation to each optimum satellite into relative vertical acceleration thereof. Block 52 receives and compares the output of block 50 with the output of gravimeter block 35 so as to obtain the difference between these outputs thereby determining the gravity magnitude of the platform at the preselected point. By reason of the computerized technique for processing the signals from each GPS satellite within the field of view of antenna 26, platform 10 as it moves along its path on or above the earth's surface can readily obtain the gravity magnitude with improved accuracy at more than one selected point therealong. Moreover, a platform 10 can be moved within a given area on or above the earth's surface for the purpose of surveying to obtain a gravity data base for the entire area.

Obviously, many modifications and variations of the present invention are possible in light of the above teachings. It is therefore to be understood that, within the scope of the appended claims, the invention may be practiced otherwise than as specifically described.

What is claimed is:

1. A method for directly and continuously determining the magnitude of the gravity at one or more selected points in relation to the earth's surface, the method comprising the steps of:

continuously transmitting encoded RF signals from a plurality of Global Positioning System (GPS) earth-orbiting satellites, such that the traasmitted RF signals of each GPS earth-orbiting satellite are a pair of encoded RF signals at predetermined frequencies that are directed in a radial direction towards the earth's surface, all GPS satellites of the plurality of satellites progressively and continuously advancing about the earth in relation to the field of view of the antenna of a user platform of the GPS system;

continuously and selectively processing the encoded RF signals received by the platform at one or more selected points from a series of GPS satellites of the plurality in the field of view of the antenna so as to initially determine the Doppler pseudo range between each satellite of the series and the platform and the radial relative velocity therebetween, further processing the encoded RF signals of the series of satellites so as to select and track an optimum group of satellites of the series that will provide minimal error in determining the navigation position of the platform and the relative radial velocity of the platform with respect to each satellite of the optimum group, also further processing the encoded RF signals of the optimum group of selected and tracked satellites so as to determine the relative radial acceleration of the platform with respect to each satellite thereof and to resolve the radial acceleration of the platform with respect to each satellite into the GPS vertical acceleration thereof, measuring the vertical acceleration of said platform at one or more selected points by way of a gravimeter accelerometer arrangement mounted on the platform, and also still further processing the encoded RF signals of the optimum group so as to compare the vertical acceleration of the platform with the GPS vertical acceleration of the platform, the comparison providing a difference that indicates the magnitude of the gravity in relation to the platform.

2. A method as in claim 1 in which each satellite of said GPS transmits the pair of encoded RF signals at predetermined L-band frequencies of 1227.6 megaHertz and 1575.42 megaHertz.

3. A method as in claim 1 in which the platform is mounted on a marine vessel.

4. A method as in claim 1 in which the platform is mounted on an aircraft.

5. A method as set forth in claim 1 in which the platform is mounted on a support that is movable along the earth's surface.

6. A method as in claim 1 wherein the plurality of GPS satellites are comprised of twenty-four satellites with the plurality of satellites being arranged in three separate groups of eight, each group being disposed in its respective longitudinal plane in relation to the earth, each longitudinal plane being one of a series of three longitudinal planes and also being arranged in spaced angular relation to the other longitudinal planes of the series and the equatorial plane of the earth; and with the satellites of each group of eight moving in a common approximately circular orbital path in their respective longitudinal plane.

7. A method as set forth in claim 6 wherein immediately adjacent longitudinal planes of the series of longitudinal planes define an angle of approximately 120° therebetween.

8. A method as set forth in claim 6 wherein each longitudinal plane of the series and the earth equatorial plane define an angle of approximately 63° therebetween.

9. A method as set forth in claim 6 wherein each satellite of the GPS is disposed at an altitude of approximately 20,000 kilometers above the earth's surface.

10. A method as set forth in claim 6 wherein the group of satellites in each longitudinal plane of the series are equally spaced from each other along their orbital path.

11. A method as set forth in claim 6 wherein each satellite orbits about the earth in approximately twelve hours.

12. A method as set forth in claim 1 wherein the field of view of the antenna is of conical configuration in an upward and outward divergent direction toward the horizon such that the solid angle of the conical field of view adjacent the antenna is approximately 160°.

13. A method as set forth in claim 1 wherein the steps of processing the encoded RF signals is effected by a geodetic receiver connected to the antenna, a receiver microprocessor, a navigation microprocessor, and a gravity microcomputer; and wherein the microcomputer and the navigation microprocessor are operatively associated with the receiver microprocessor.

14. A method as set forth in claim 1 wherein the magnitude of the gravity has an error of less than 5 milligals when a user platform has a speed of less than 100 meters/second.

15. A method as set forth in claim 1 wherein the step of measuring the vertical acceleration of said platform is effected by the gravimeter accelerometer arrangement being made up of a plurality of three linear accelerometers.

* * * * *